(12) United States Patent
Campagna

(10) Patent No.: US 7,127,740 B2
(45) Date of Patent: Oct. 24, 2006

(54) MONITORING SYSTEM FOR A CORPORATE NETWORK

(75) Inventor: Matthew J. Campagna, Ridgefield, CT (US)

(73) Assignee: Pitney Bowes Inc., Stamford, CT (US)

( * ) Notice: Subject to any disclaimer, the term of this patent is extended or adjusted under 35 U.S.C. 154(b) by 1106 days.

(21) Appl. No.: 10/021,454

(22) Filed: Oct. 29, 2001

(65) Prior Publication Data

US 2003/0084279 A1   May 1, 2003

(51) Int. Cl.
*G06F 9/00* (2006.01)

(52) U.S. Cl. .............................. 726/12; 726/13; 726/14; 726/15

(58) Field of Classification Search ................ 726/4–7, 726/11–15, 24–25, 30, 34; 380/281
See application file for complete search history.

(56) References Cited

U.S. PATENT DOCUMENTS 5,805,803 A * 9/1998 Birrell et al. ................. 726/12
6,167,521 A * 12/2000 Smith et al. ................... 726/21
6,233,685 B1   5/2001 Smith et al. ................. 713/194
6,393,568 B1 * 5/2002 Ranger et al. .............. 713/188
6,834,342 B1 * 12/2004 Halliday et al. ............ 713/168

* cited by examiner

*Primary Examiner*—Norman M. Wright
(74) *Attorney, Agent, or Firm*—Steven J. Shapiro; Angelo N. Chaclas

(57) ABSTRACT

A monitoring system for a corporate network includes a client that exchanges information with a target server to establish an SSL communication channel through which cryptographically protected data is exchanged between the client and the target server using an SSL protocol and a monitoring server through which the cryptographically protected data is routed as part of its exchange between the client and the target server. The client sends enabling data to the monitoring server that enables the monitoring server to read the cryptographically protected data received at the monitoring server as decoded cryptographically protected data. The monitoring server also analyzes the decoded cryptographically protected data to determine if it is suspect data, and at times when the monitoring data determines that the decoded cryptographically protected data is suspect data the monitoring server prevents the transmission of the cryptographically protected data between the client and the target server.

20 Claims, 1 Drawing Sheet

MONITORING SYSTEM FOR A CORPORATE NETWORK

BACKGROUND OF THE INVENTION

The proliferation of personal computers at the household level has led to an unprecedented use of the Internet for buying items, conducting other business transactions, and obtaining information. In many instances, confidential information such as credit card numbers and social security numbers are exchanged online. Accordingly, in order to protect the exchange of such confidential information, the Secure Sockets Layer Protocol (SSL) was developed. The SSL is an application layer protocol designed to protect communications layered over the transport control protocol/Internet protocol (TCP/IP). The use of SSL is commonplace within most corporate environments and nearly all online merchants provide SSL communication to protect the security of confidential information received from consumers.

While the use of SSL has the benefit of providing for the secure transmission of data, it is counterproductive with respect to a corporation's need to affectively protect its internal network against software viruses and to closely monitor the content of data electronically transmitted into and out of the corporate network. That is, most corporations have at least one corporate monitoring server (TCM Server) through which all incoming and outgoing corporate electronic communications pass. The TCM server typically has anti-virus applications that are used to detect and prevent viruses from being disseminated through the corporate network. Additionally, the TCM server may include a firewall which will prevent the transmission of data into or out of the corporate network based on destination or source IP addresses, the port to which the transmission is directed, or the content of the data being transmitted. Therefore, in those instances where the anti-virus applications and the firewall technology require access to the application layer data in order to be effective, the use of the SSL prevents the TCM server from being able to read and filter the application layer data.

The above situation is particularly important in a corporate (or government environment) where proprietary and confidential information is closely guarded. If SSL communications are permitted, the free electronic dissemination of such proprietary and confidential information via the Internet is possible without the approval or knowledge of the corporate or government entity. The unauthorized dissemination of such important information can expose the company to severe economic disadvantages and legal liability in those instances where the company has a legal obligation to control the dissemination of such information.

Presently, a company could prevent all SSL communications from passing through the TCM server in order to overcome the problems discussed above. However, this approach eliminates the use of SSL entirely including those SSL communications that are legitimate and needed for business purposes.

Accordingly, what is needed is a method and apparatus that permits an SSL communication through a TCM server while providing the TCM server with the ability to read and filter such SSL transmissions.

SUMMARY

A monitoring system for a corporate network includes a client that exchanges information with a target server to establish an SSL communication channel through which cryptographically protected data is exchanged between the client and the target server using an SSL protocol and a monitoring server through which the cryptographically protected data is routed as part of its exchange between the client and the target server. The client sends enabling data to the monitoring server that enables the monitoring server to read the cryptographically protected data received at the monitoring server as decoded cryptographically protected data. The monitoring server also analyzes the decoded cryptographically protected data to determine if it is suspect data, and at times when the monitoring data determines that the decoded cryptographically protected data is suspect data the monitoring server prevents the transmission of the cryptographically protected data between the client and the target server.

BRIEF DESCRIPTION OF THE DRAWINGS

The accompanying drawing, which is incorporated in and constitutes a part of the specification, illustrates a presently preferred embodiment of the invention, and together with the general description given above and the detailed description of the preferred embodiment given below, serves to explain the principles of the invention.

DETAILED DESCRIPTION OF THE PREFERRED EMBODIMENTS

Figure 1:
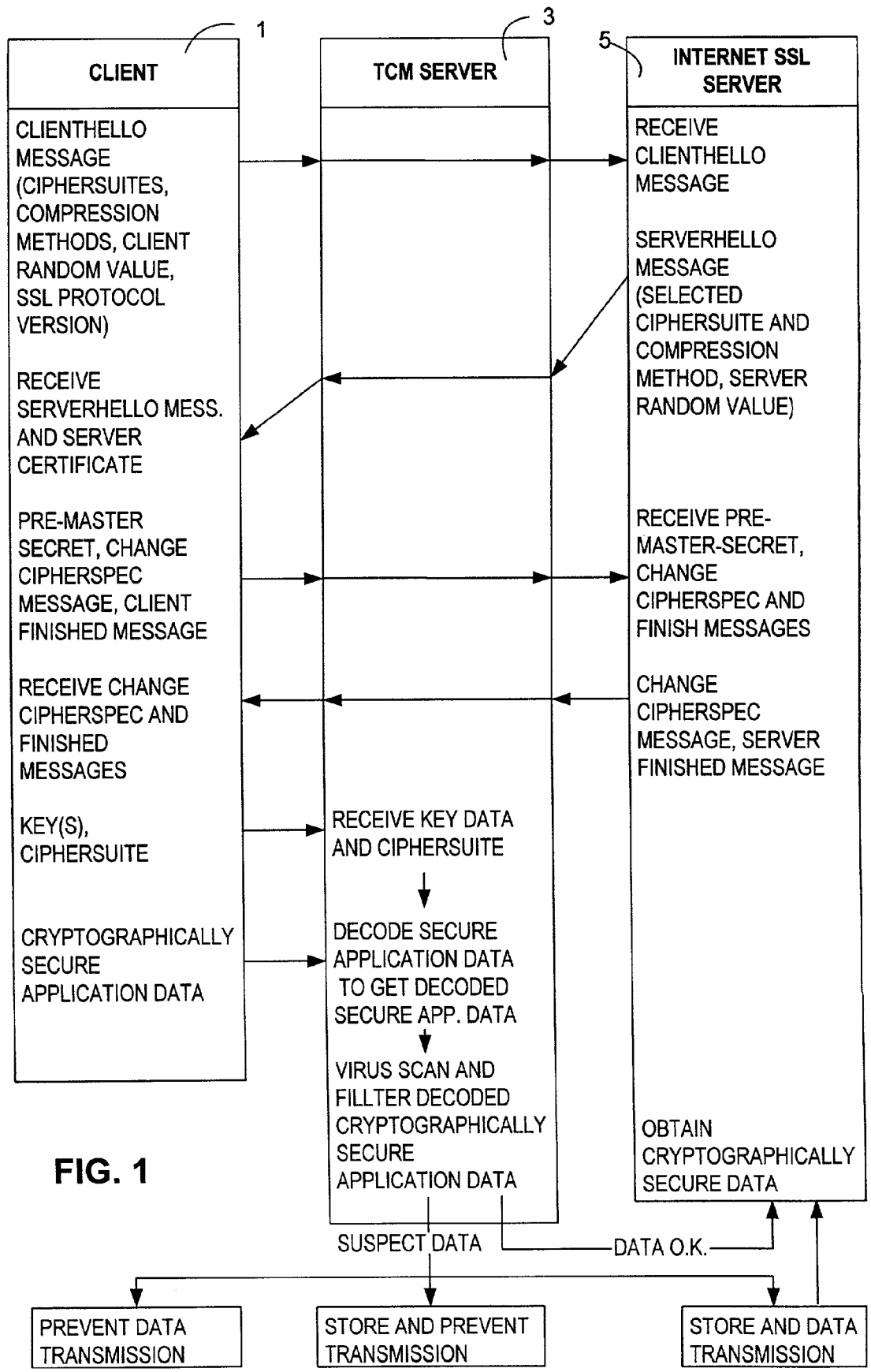
FIG. 1 shows a corporate network incorporating the inventive monitoring system.

FIG. 1 shows a basic communication system including a corporate client 1, a Trusted Corporate Monitoring Server (TCM Server) 3, and an Internet SSL Server 5. SSL communications between the client 1 and server 5 are all routed through TCM server 3. While one client 1 and one TCM server 3 are shown, a corporate network may include a plurality of clients 1 and TCM servers 3, all of which can be implemented to follow the inventive process set forth in FIG. 1 for SSL communications.

When the client 1 needs to exchange secure information with the Internet SSL server 5, a secure SSL channel must be established. The client 1 initiates the process by sending a ClientHello Message to the SSL server 5 via the TCM server 3. The ClientHello Message typically identifies the SSL version being used, the ciphersuites (key-exchange protocol, secret-key encryption algorithm, cryptographic hash algorithm) and compression methods available at the client 1, and a client random value generated at the client 1 for the instant communication session.

In response to receipt of the ClientHello message, the SSL server 5 returns a ServerHello message to the client 1. The ServerHello message identifies the ciphersuite and compression method that the server 5 has selected from the identified options available at the client 1. The ServerHello message also identifies a server random value generated at the server 5. In addition to the ServerHello Message, the server 5 also sends its public key certificate to the client 1.

Upon receipt of the server public key certificate, the client 1 obtains the server's public key in a conventional manner. The client 1 then follows the SSL protocol to generate a Pre-Master-Secret.

The Pre-Master-Secret is combined at the client 1 with the client and server random values to generate a key block, which is then divided into the appropriate keys needed to satisfy the negotiated ciphersuite. Thus, for example, the keys that are generated may include DES read and write keys as well as hash algorithm read and write keys. However, the ultimate number of keys obtained will depend on the negotiated ciphersuite.

The client 1 also encrypts the Pre-Master-Secret using the server's public key and the selected key-exchange protocol (i.e. RSA, Diffie-Hellman) and sends the encrypted Master Secret to the server 5. The client 1 also sends a change cipherspec message to the server 5 to identify that the client 1 is using the negotiated ciphersuite. The client 1 then sends a finished message to the server 5 such as a hash of the combination of all messages sent by the client and the Master Secret. Thus, the finished message is cryptographically secured using the new algorithms, keys, and Master Secret.

The server 5 decrypts the received encrypted Pre-Master-Secret using the server's private key that is associated with the server's public key. The server 5 generates the key block and determines the keys needed to satisfy the negotiated ciphersuite in the same manner as the client 1. The server 5 checks the integrity of the data received from the client 1 by comparing its own generated hash to the hash received from the client 1. Once the integrity check is completed, the SSL server 5 sends a finished message (such as a hash of the combination of all server messages sent to the client 1 and the Master Secret) and a change cipherspec message to the client 1. The client 1 checks the integrity of the finished message received from the server 5 using the derived keys and the negotiated ciphersuite. If the integrity check is successful, the SSL handshake protocol has been successfully completed.

Upon completion of the SSL handshake protocol, the prior art system would begin the exchange of the application data using the SSL application data protocol. However, as discussed above, in the prior art the TCM server 3 was not capable of reading the secure data resulting in the problem discussed in the background of the invention section. The instant invention overcomes these problems by modifying the SSL protocol. Accordingly, once the SSL handshake protocol is successful completed, the instant invention requires the client 1 to securely transmit the Pre-Master-Secret and the negotiated ciphersuite (the ciphersuite may reside at the TCM server 3 such that only a designation of the negotiated cipher suite must be sent) to the TCM server 5. The negotiated ciphersuite and Pre-Master-Secret are combined and encrypted using the public key of the TCM server 5. Upon receipt, the TCM server 5 uses its private key to obtain the negotiated ciphersuite and the Pre-Master-Secret. Once the TCM server 5 has this information, it can generate the keys required for the negotiated ciphersuite in the same manner as the client 1 and server 5. One possessing ordinary skill in the art will recognize that other forms of cryptography can be used to securely transmit the ciphersuite information and any relevant keying information (that is needed by the TCM server 3 to obtain the required key set) to the TCM server 3.

Once the TCM server 3 has obtained the ciphersuite and relevant keying information, the secure exchange of application data between the client 1 and server 5 is permitted using a conventional SSL application data protocol. However, in the instant invention, the secure application data transmitted by the client 1 is first routed to and read by the TCM server 3 using the ciphersuite and keys obtained at the TCM server 3. The TCM server 3 has virus scanning programs and a firewall/filtering capability resident therein which are respectively used to detect viruses and data that the corporation does not want transmitted outside the corporate network. If the virus scan and filtering checks are acceptable, the secure application data is transmitted from the TCM server 3 to the intended Internet SSL server 5. However, if the application data read at TCM server 3 is suspect from a virus or firewall/filtering viewpoint, a number of options are available to the TCM server 3 with respect to the handling of such suspect data. It is to be noted that in the context of this application the secure application data is also referred as "cryptographically protected data". Further, the TCM server 3 reads the cryptographically protected data by decoding it. Thus, this "decoded cryptographically protected data" is the underlying protected application data that has been decoded and read. Moreover, the TCM server 3 can also verify the integrity of the read decoded cryptographically protected data.

In a first scenario, the TCM server 5 can store the decrypted suspect data and route the secure data to the Internet SSL server 5. In this situation the secure data is still routed to the SSL server 5 but the decrypted suspect data is available for subsequent analysis by the corporation. Accordingly, if confidential and proprietary information has been sent to the SSL server 5, this fact can be readily ascertained. Moreover, the stored suspect data will show the originating and destination addresses and can be time-stamped to determine the exact time and date of the transmission. Therefore, the corporation can actively investigate the situation.

In a second scenario, the TCM server 3 will store the suspect data as discussed above but will prevent the transmission of the secure data to the SSL server 5. The stored data can subsequently be analyzed by corporate security to determine if a breach of security has occurred. If a breach of security has not occurred, the secure data can be transmitted to the SSL server 5 after a release is received from corporate security.

In yet another embodiment of the second scenario, the TCM server 5 can send a message back to the client 1 advising that the secure data has not been transmitted and is being held for further security review. This message would permit the user to contact security to expedite a review of the stored suspect data so as not to unnecessarily delay the transmitting of data that is not in breach of security regulations.

Finally, in a last scenario, the TCM server 3 can simply prevent the transmission of data to the SSL server 5 if the decrypted data fails the virus or firewall/filter screening. In this situation, the TCM server 5 notifies the client 1 that the data was not transmitted. While this last scenario provides a simple way of preventing the transmission of suspect data, the failure to capture the suspect data as evidence in future proceedings makes it less desirable than the other options set forth above.

The embodiments described above focus on the monitoring of messages that are being sent out of the corporate network. However, the same filtering can be applied to incoming data as well. Additionally, the types of filtering that occur at the TCM server 3 can be based on originating or destination addresses, ports, or specific data content. For example, all data can be screened for the words "proprietary" or "confidential". If any data contains these words the TCM server 3 will classify the data as being suspect data. One skilled in the art will recognize that various static and non-static screening mechanisms can be employed based on the corporations needs.

Further, the description above recites that the Pre-Master-Secret is transmitted to the TCM server 3 thereby making the full set of ciphersuite keys available to the TCM server 3. However, in another embodiment only a subset of the ciphersuite key set is sent to TCM server 3. For example, if a corporation is only concerned with controlling the dissemination of outgoing data, only the ciphersuite write keys are needed by the TCM server 3. By limiting the TCM server 3 to only have possession of the client write keys, all outgoing cryptographically protected data can be screened at the TCM server 3 while the privacy of all incoming data is maintained even at the TCM server 3.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims.

What is claimed is:

1. A method for monitoring cryptographically protected data being transmitted between a client and a target server via a monitoring server, the method comprising the steps of:
   exchanging information between the client and the target server to enable the cryptographically protected data to be created and read as decoded cryptographically protected data at both the client and the target server;
   sending to the monitoring server enabling data associated with the information exchanged between the client and the target server, the enabling data enabling the monitoring server to read the cryptographically protected data transmitted through the monitoring server as the decoded cryptographically protected data;
   analyzing the decoded cryptographically protected data at the monitoring server for determining if the non-cryptographically protected data is suspect data; and
   at times when the monitoring server determines that the decoded cryptographically protected data is suspect data preventing the transmission of the cryptographically protected data between the client and the target server.

2. A method as recited in claim 1, wherein the information exchanged between the client and the target server results in the client and target server using a common ciphersuite and a common set of ciphersuite keys for creating the cryptographically protected data and reading the cryptographically protected data as decoded cryptographically protected data.

3. A method as recited in claim 2, wherein the enabling data identifies the common ciphersuite and provides the monitoring server with the ability to obtain the common set of ciphersuite keys.

4. A method as recited in claim 2, wherein the enabling data identifies the common ciphersuite and provides the monitoring server with a subset of the common set of ciphersuite keys.

5. A method as recited in claim 4, wherein having the subset of the common set of ciphersuite keys and the ciphersuite provides the monitoring server with the ability to read any of the cryptographically protected data created at the client and sent to the target server via the monitoring server but does not provide the monitoring server with the ability to read cryptographically protected data created at the target server and sent to the client via the monitoring server.

6. A method as recited in claim 1, further comprising storing the suspect data for future analysis.

7. A method as recited in claim 6, wherein the contents of the decoded cryptographically secure data is analyzed at the monitoring server and determined to be suspect data if the contents include data that has previously been identified as not being appropriate for transmission between the client and the target server.

8. A method as recited in claim 6, wherein the contents of the decoded cryptographically secure data is analyzed at the monitoring server and determined to be suspect data if it includes any known viruses.

9. A method as recited in claim 1, wherein the exchanging of information between the client and target server establishes an SSL communication session between the client and target server.

10. A method as recited in claim 9, wherein the client and monitoring server are implemented as part of a private corporate network.

11. A monitoring system for a corporate network comprising:
    a client that exchanges information with a target server to establish an SSL communication channel through which cryptographically protected data is exchanged between the client and the target server using an SSL protocol: and
    a monitoring server through which the cryptographically protected data is routed as part of its exchange between the client and the target server;
    wherein the client sends enabling data to the monitoring server that enables the monitoring server to read the cryptographically protected data received at the monitoring server as decoded cryptographically protected data, the monitoring server analyzes the decoded cryptographically protected data to determine if it is suspect data, and at times when the monitoring data determines that the decoded cryptographically protected data is suspect data the monitoring server prevents the transmission of the cryptographically protected data between the client and the target server.

12. A monitoring system as recited in claim 11, wherein the establishment of the SSL communication channel results in the client and target server using a common ciphersuite and a common set of ciphersuite keys for creating the cryptographically protected data and reading the cryptographically protected data as decoded cryptographically protected data.

13. A monitoring system as recited in claim 12, wherein the enabling data identifies the common ciphersuite and provides the monitoring server with the ability to obtain the common set of ciphersuite keys.

14. A monitoring system as recited in claim 12, wherein the enabling data identifies the common ciphersuite and provides the monitoring server with a subset of the common set of ciphersuite keys.

15. A monitoring system as recited in claim 14, wherein having the subset of the common set of ciphersuite keys and the ciphersuite provides the monitoring server with the ability to read any of the cryptographically protected data created at the client and sent to the target server via the monitoring server but does not provide the monitoring server with the ability to read cryptographically protected data created at the target server and sent to the client via the monitoring server.

16. A monitoring system as recited in claim 11, further comprising means for staring the suspect data.

17. A monitoring system as recited in claim 11, wherein the decoded cryptographically secure data is considered to be the suspect data if it includes any known viruses.

18. A monitoring system as recited in claim 11, wherein the decoded cryptographically secure data is considered to be the suspect data if it includes data that has been pre-designated as being inappropriate for transmission between the client and the target server.

19. A monitoring system as recited in claim 11, wherein the data that has been pre-designated as being inappropriate for transmission between the client and the target server is confidential or proprietary information.

20. A method for monitoring cryptographically protected data being transmitted between a client and a target server via a monitoring server, the method comprising the steps of:

exchanging information between the client and the target server to enable the cryptographically protected data to be created and read as decoded cryptographically protected data at both the client and the target server;

sending to the monitoring server enabling data associated with the information exchanged between the client and the target server, the enabling data enabling the monitoring server to read the cryptographically protected data transmitted through the monitoring server as the decoded cryptographically protected data;

analyzing the decoded cryptographically protected data at the monitoring server for determining if the decoded cryptographically protected data is suspect data; and at times when the monitoring server determines that the decoded cryptographically protected data is suspect data storing the suspect data and allowing the transmission of the cryptographically protected data between the client and the target server.

* * * * *